Jan. 21, 1969  D. S. WYSE  3,422,544
AUTOMOBILE SAFETY LEVEL INDICATOR
Filed Jan. 16, 1967
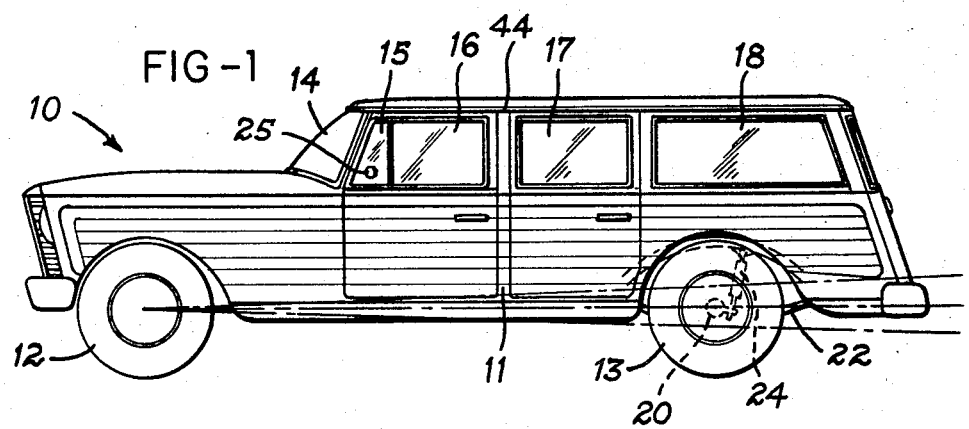
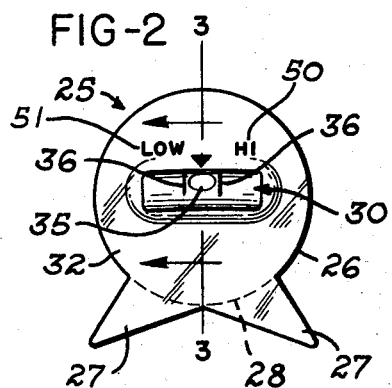
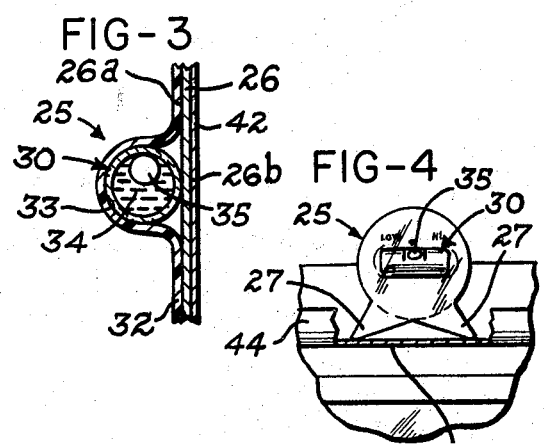
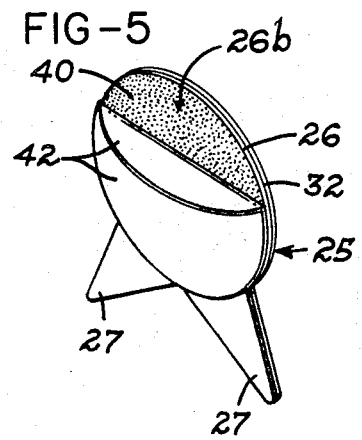
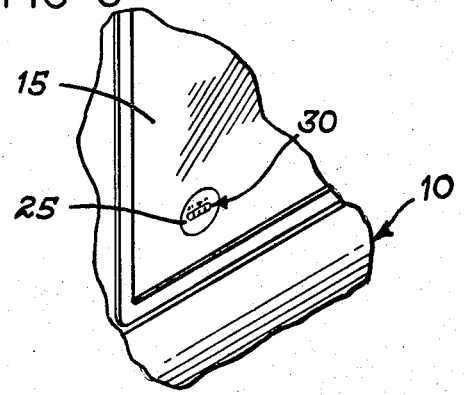
INVENTOR.
DAVID S. WYSE
BY
*Marechal, Biebel, French & Bugg*
ATTORNEYS United States Patent Office 3,422,544
Patented Jan. 21, 1969

3,422,544
AUTOMOBILE SAFETY LEVEL INDICATOR
David S. Wyse, c/o Projects Unlimited, Inc., 1926 E.
Siebenthaler Ave., Dayton, Ohio 45414
Filed Jan. 16, 1967, Ser. No. 609,490
U.S. Cl. 33—207    3 Claims
Int. Cl. G01c 9/02

ABSTRACT OF THE DISCLOSURE

A safety level device adapted to be utilized in connection with a vehicle having booster type shock absorbers and enabling the owner of the vehicle to level the vehicle regardless of the load so that the vehicle handles properly and the headlights are properly directed.

Background of the invention

Booster type shock absorbers are sold as an accessory for vehicles which will be alternately carrying heavy loads and no load, e.g. station wagons. By adding and venting pressurized air from the shock absorbers, the particular load conditions of the vehicle can be compensated for so that it rides approximately level. Heretofore, depending on the load in the vehicle and the pressure in the shock absorbers, the booster type shock absorbers frequently caused the rear portion of the vehicle to be tiled upwardly wherein the dim headlights appear as bright lights or downwardly wherein the bright headlights appear as dim lights. For example, when a heavy load was placed into the vehicle and the shock absorbers properly pressurized to approximately level the vehicle and subsequently the load was removed, the rear portion of the vehicle was elevated thus making it difficult to handle and decreasing the range of the headlights.

Summary of the invention

In this invention, a small safety level device is provided to enable the driver to precisely level his vehicle. Frst, the vehicle is initially leveled by using the device mounted loosely on the vehicle and then the level device is permanently attached to the vehicle in a position where it can be easily viewed by the driver so that the air can be easily added to or vented from the booster shock absorbers.

Brief description of the drawings

FIG. 1 is a side elevation view of a station wagon type vehicle utilizing the present invention;

FIG. 2 is an elevation view of the level device in accordance with the invention;

FIG. 3 is a sectional view taken along the line 3—3 of FIG. 2;

FIG. 4 is a fragmentary illustration of the initial leveling operation;

FIG. 5 is a perspective view showing the rear surface of the level device;

FIG. 6 is a perspective view showing the device permanently attached to the window of the vehicle.

Description of the preferred embodiment

Referring now to the drawings wherein a preferred embodiment of the invention is shown, FIG. 1 illustrates a station wagon type of vehicle 10 having the elongated body 11 supported by the front and rear wheels 12 and 13. The body 11 includes the front windows 14 having the various side windows 15, 16, 17 and 18 including the front vent window 15 which pivots to an open position rather than being raised and lowered as the other side windows 16, 17 and 18.

The rear axle 20 is supported on the body 11 by the arcuate leaf spring 22 in a conventional manner. The booster shock absorber 24 is used to cushion the shocks as well as to provide additional spring force when a heavy load is being carried in the vehicle 10. Such vehicles are commonly used by large families to carry as many as nine people or to carry heavy loads of equipment. As explained above, the booster shock absorbers 24 can have their spring force increased or decreased by appropriately adding or venting pressurized air therefrom through suitable conventional valve means (not shown).

The level device 25 of the present invention is shown in detail in FIGS. 2–5, and includes a generally circular backing member 26 of waterproof flexible material for example, treated paper, cardboard, or plastic material. The triangular shaped feet 27 extend from the lower edge thereof and a serrated line 28 is provided between these feet and the circular backing member so that the feet can be removed, as will be explained. The elongated tubular level 30 is secured centrally on the backing member 26 by the clear plastic material 32 which is suitably shaped to cover the level 30 and be adhesively secured to the entire front surface 26a of the backing member 26 (FIG. 3). Thus the level 30 is secured in place against relative movement on the backing member 26.

The level 30 itself includes the elongated tubular housing 33 which is substantially filled with a suitable liquid material 34 having the small air pocket or bubble 35 therein. The two indicator lines 36 are provided centrally in the housing 33 so that when the air bubble or pocket 35 is aligned between the indicator line the level 30 is disposed in a horizontal plane. It is an important feature of the invention that the axis of the level 30 be disposed parallel to a line through the lowermost tips of the feet 27.

The rear surface 26b of the backing member 26 is coated with an adhesive material 40 which will suitably permanently secure the device 25 to any flat clean surface. During shipment, a cover 42 is provided on this adhesive material which can be easily peeled off prior to use.

In operation, when the level device 25 is to be applied to the vehicle 10 for use in combination with the booster shock absorbers 24, the vehicle 10 is placed on a surface which is known to be substantially flat and lying in a horizontal plane. The level device is then placed in the rain gutter 44 of the vehicle, as shown in FIG. 4, with the feet 27 engaging the bottom surface 45 of the gutter to support the device 25 therein. The air pressure in the shock absorbers is then adjusted by appropriately applying additional pressure or venting pressure until the bubble 35 indicates that the level 30 and thus the vehicle 10 are in a horizontal plane. In this condition, the vehicle handles much more safely and the headlights project in the proper designed directions.

Next, without moving the vehicle 10, the feet 27 are torn from the circular backing member 26 and discarded and the cover 42 peeled from the member 26, and this member applied to the inside surface of the vent window 15 in such a manner that the bubble 35 is centered in the level 30. At this point, the vehicle is level, the permanently positioned level device is indicating this condition, and the shock absorbers 24 are properly pressurized.

Thereafter, any time a heavy load is placed in the vehicle 10, it is merely necessary to drive into a service station and have the operator apply additional pressurized air to the booster shock absorbers 24 until such time as the level 30 indicates that the vehicle is level. The "Hi" and "Low" indicators 50 and 51 indicate whether the rear portion of the vehicle is high or low so that the operator can easily tell whether to add or vent air. Similarly, when the load is removed, it is merely necessary to vent air from the shock absorbers until the horizontal condition is reached as indicated by the level device 25. Because the device is permanently secured on the vent window 15 in full view of the driver, the driver need not level the driver's seat during the servicing operation. It is merely necessary for the driver to signal the service station attendant when the proper adjustment has been made.

Accordingly, the invention has provided a means for substantially precisely adjusting the pressurization of the booster shock absorbers so that the vehicle remains in a level condition for proper handling and proper direction of the headlights. While the invention is described in combination with the booster type shock absorbers, it has application to vehicles without such shock absorbers to indicate that the conventional shock absorbers are wearing or that the vehicle is overloaded so that the headlights are not projecting at the proper angles. In this condition, the driver must take additional measures to protect himself and the drivers of passing vehicles, e.g., by driving slower and with only the low beam lights on.

What is claimed is:

1. A level device for indicating longitudinal deviation from a horizontal plane adapted for use with a vehicle having vertical side windows, said level device comprising, a backing member of a flat flexible material adapted to have one side thereof secured to a substantially vertical surface of one of said windows parallel to the length of the vehicle, a single elongated closed housing filled with a liquid and having an air bubble therein adapted to be centered between indicator lines when the level is in a horizontal plane, a clear plastic material covering said housing to secure it to said backing member parallel to the plane of the surface of the window so that said housing is held closely adjacent the window, downwardly extending feet means on said backing member having aligned lower support surfaces correlated with said level so that when said feet means engages a horizontal surface said level indicates that it is horizontal, said feet means adapted to engage a horizontal portion the vehicle to initially level the vehicle, said feet means being triangular downwardly extending members having their lowermost apexes extending below any portion of the device, means connecting said feet means to said body to enable said feet means to be easily and permanently removed from said backing member prior to the permanent attachment of said backing member to the window, and pressure sensitive means for securing said one side to a flat surface to the window of the vehicle in easy view of the driver and with said housing parallel to the direction of travel of the vehicle to indicate whether the vehicle is level or not.

2. A level device as defined in claim 1 for use on a vehicle having booster type shock absorbers, said air bubble in said housing indicating when said booster type shock absorbers are over and under pressurized by sensing the deviation of the rear portion of the vehicle from the optimum height.

3. A level device as defined in claim 1 wherein said backing member has a smooth surface opposite said one side, and said clear plastic material covers said housing and the entire area of said smooth surface of said backing member.

References Cited

UNITED STATES PATENTS

| | | | |
|---|---|---|---|
| 2,607,129 | 8/1952 | Updyke | 33—207 |
| 2,970,381 | 2/1961 | Pierce | 33—207 |
| 3,146,529 | 9/1964 | Chamberlin | 33—207 |
| 3,269,729 | 8/1966 | Morrison | 33—207 XR |

WILLIAM D. MARTIN, JR., *Primary Examiner.*

U.S. Cl. X.R.

33—211